United States Patent
Degen et al.

(10) Patent No.: US 6,418,436 B1
(45) Date of Patent: Jul. 9, 2002

(54) SCORING METHODOLOGY FOR PURCHASING CARD FRAUD DETECTION

(75) Inventors: Robert G. Degen; Duane Ritter, both of Marietta, GA (US)

(73) Assignee: First Data Corporation, Hackensack, NJ (US)

( * ) Notice: Subject to any disclaimer, the term of this patent is extended or adjusted under 35 U.S.C. 154(b) by 0 days.

(21) Appl. No.: 09/467,621

(22) Filed: Dec. 20, 1999

(51) Int. Cl.$^7$ .............................................. G06F 17/30
(52) U.S. Cl. ..................................... 707/6; 707/104.1
(58) Field of Search .............................. 705/1, 26, 35; 707/1, 6, 10, 2, 3, 4, 5

(56) References Cited

U.S. PATENT DOCUMENTS

| | | | | |
|---|---|---|---|---|
| 5,062,074 A | * | 10/1991 | Kleinberger | 707/5 |
| 6,134,340 A | * | 10/2000 | Hsu et al. | 382/124 |
| 6,289,111 B1 | * | 9/2001 | Takhar | 340/5.82 |

* cited by examiner

*Primary Examiner*—Dov Popovici
*Assistant Examiner*—Apu M Mofiz
(74) *Attorney, Agent, or Firm*—Brooks & Kushman, P.C.

(57) ABSTRACT

A method and system is disclosed for scoring a match between applicant data provided by a client and data stored in a fraud database. The system includes a merchant application having a unique identifier portion, a non-unique identifier portion, and a reference portion, a processor having access to the merchant information for calculating a first match score based on a match occurring in the non-unique identifier portion, a second match score based on a match occurring in the unique identifier portion, and a third match score based on a match occurring in the reference portion, and wherein the processor sums the first, second, and third match scores to arrive at a total match score to determine whether the total match score has exceeded a predefined match score. If the predefined match score is exceed then an alert is sent to the client informing the client that a fraud match with a high degree of reliability has occurred.

18 Claims, 7 Drawing Sheets

MERCHANT APPLICATION
SUMMARY DOCUMENT-FAX INFORMATION

302 {
- 302.1 Today's Date:
- 302.2 Date on Application
- 302.3 Application Type: Telephone/Faxed/Internet/Direct Sales
- 302.4 Business Name
- 302.5 Corporate Name
- 302.6 Business Address/City/State/ZipCode
- 302.7 Business Telephone: (Area Code + Number)
- 302.8 Business Fax Numbers (Area Code + Number)
- 302.9 Mailing Address/City/State/ZipCode
- 302.10 E-Mail Address
- 302.11 WebSite Address
- 302.12 WebSite Telephone
- 302.13 Federal Tax Identification Number
- 302.14 Principal Name [Last Name, (Suffix-Sr., Jr., etc.) First Name, Middle Initial]
- 302.15 Social Security Number
- 302.16 Principal Home Address/City/State/ZipCode
- 302.17 Home Telephone Number
- 302.18 Principal Name [Last Name, (Suffix-Sr., Jr., etc.) First Name, Middle Initial]

*Fig. 5a*

302.19 Social Security Number 302.20 Principal Home Address/City/State/ZipCode 302.21 Home Telephone Number 302.22 Bank Account Number 302.23 Bank Routing Number

*REFERENCES:*

302.24 Person - [Last (Suffix-Sr., Jr., etc.), First]

302.25 Reference Telephone Number 302.26 Person - [Last (Suffix-Sr., Jr., etc.), First]

302.27 Reference Telephone Number 302.28 Business Reference 302.29 Business Reference Telephone 302.30 Business Reference 302.31 Business Reference Telephone

*SECONDARY DATA SEARCH:*

302.32 Sales Representatives Name [Last Name, (Suffix-Sr., Jr., etc.), First Name, Middle Initial]

302.33 SIC Code 302.34 Product Type

SCORING METHODOLOGY FOR PURCHASING CARD FRAUD DETECTION

TECHNICAL FIELD

The present invention relates to systems and methods for detecting and preventing purchasing card fraud.

BACKGROUND ART

Roughly half a billion transactions with significant, but preventable, fraud potential occur in the United States each year. Purchasing card contact events that can lead to fraudulent occurrences include application processing, card activation, usage, such as mail and phone ordering, convenience events, such as address or other information changes. It is estimated that the total cost of fraud is $1.3 million for every one million gross active accounts, or 1.34 in fraud loss per gross active account (sources: Visa/MasterCard, Credit Card Prevention Source Book).

A large portion of this fraud could effectively be addressed through improved identification of known fraudulent names, fraudulent addresses, fraudulent phone numbers, fraudulent social security numbers, and other fraudulent personal information. In fact, a large number of fraud cases are typically perpetrated by repeat offenders or organized rings who use the same fraudulent personal information.

The current tools to combat repeat and organized fraud are still under development. However, one tool soon to be implemented pools personal data known to be fraudulent in a central database. A merchant application is sent to the fraud database for inspection. The applicant information is compared with known fraudulent information stored within the database. If a match occurs an alert is sent to the merchant alerting the merchant that a fraud is potentially being perpetrated.

Although the prior art system described above works for its intended purpose one problem not addressed by the prior art system is the high potential for sending a false positive match warning to the merchant. For example, portions of a merchant application when compared against the known fraudulent information may match while other portions may not match the known fraudulent information and thus cause an alert to be sent to the merchant applicant without an indication of the overall reliability of the match. Without an indication of how reliable the match is there is a significant probability that a false positive match will be sent to the client.

Therefore, a need exists for a new and improved system and method for determining whether a fraud match has occurred as well as providing an indication of the reliability of the fraud match.

DISCLOSURE OF INVENTION

Therefore, it is object of the present invention to provide a system and method for scoring a fraud match to indicate the reliability of the fraud match.

In accordance with this and other objects, the present invention provides a method for scoring a match between applicant data provided by a client and data stored in a fraud database. The method includes determining whether an applicant data portion matches a fraud data portion in the fraud database, ascertaining whether the applicant data portion which matches the fraud data portion occurs in a unique identifier portion of the applicant data, establishing whether the matched applicant data occurs in an applicant field which is a non-unique identifier field, discerning whether the matched applicant data occurs in an applicant field which is a reference field, calculating a first match value based on whether the match occurs in the non-unique identifier field, a second match value based on whether the match occurs in the unique identifier field, and a third match values to arrive at a total match value based on the field the match occurs in, and concluding that a match has occurred if the total match value exceeds a predefined value.

In accordance with another aspect of the present invention a system is provided for scoring a match between applicant data provided by a client and data stored in a fraud database. The system includes a merchant application having a unique identifier portion, a non-unique identifier portion, and a reference portion, a processor having access to the merchant information for calculating a first match score based on a match occurring in the non-unique identifier portion, a second match score based on a match occurring in the unique identifier portion, and a third match score based on a match occurring in the reference portion, and wherein the processor sums the first, second, and third match scores to arrive at a total match score to determine whether the total match score has exceeded a predefined match score.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
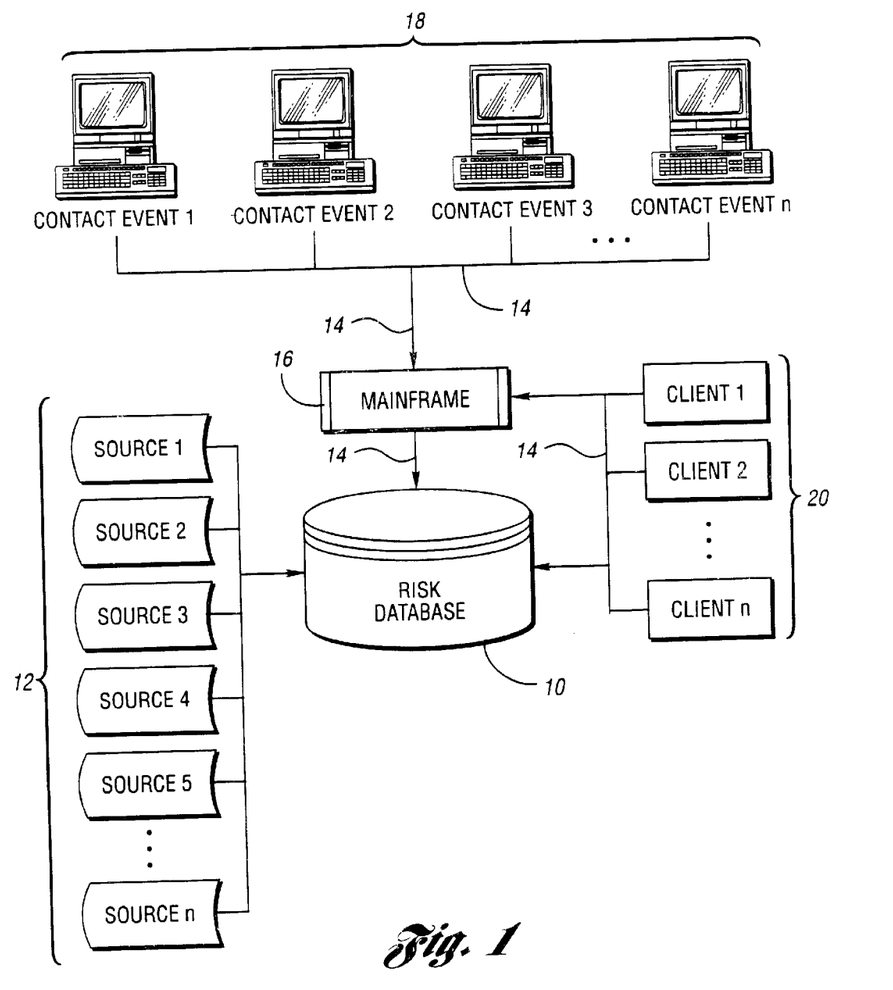
FIG. 1 is a schematic representation of a purchasing card fraud detection system utilized by the present invention.

With reference to FIG. 1, the system of the present invention preferably includes a single, comprehensive risk database 10 for the detection of purchasing card fraud. The risk database 10 may include information from various sources 12, as will be described below. The risk database is preferably server-based and has connectivity, via a local area network 14 (LAN) or other network, to a mainframe 16. The mainframe 16 is provided for on-line transactions involving the various contact events 18 described above. Clients 20 are provided with connectivity to the risk database 10 for file transfer and general access, and are also provided connectivity to mainframe 16 (Graphical User Interface, dummy terminal or the like) for receipt of fraud alerts and queue information. An optional, more limited database (not shown)

could be provided for non-contributors to the risk database. Preferably, a backup server is provided.

The system of the present invention possesses the technical functionality to pool data from multiple sources in multiple formats and to standardize reporting structure guidelines, enabling the risk database to function for many types of transactions or contact events 18. In addition, the system provides the ability to query in real time, "near" real time, or via batch with on-line interfaces to the mainframe transactions. Preferably, limited client 20 resources are required for access.

In a preferred embodiment, at the mainframe 16 level, a daily queue statistics report is developed at the client 20 level to identify all accounts that match the risk database 10, including the source of the data match. Furthermore, at the server level, reports are generated which track contributor statistics. In addition, reporting is developed to track client statistics on a query basis, such as by the number of record transactions queried against the risk database 10, or by the number of records with a data match.

Possible sources for the consortium fraud database 10 include client databases, credit card issuer databases, credit bureau databases, research and investigation fraud files, ANI risk databases, the U.S. Postal Service NRI database, Account Takeover modeling/scoring, the Social Security Administration, the Department of Motor Vehicles, Western Union, Telecheck, the American Business List, law enforcement, court and public information records, phone directories, and direct mail surveys.

From such sources, the available data includes, but is not limited to, 1) personal information, such as addresses, phone numbers, and social security numbers used in known frauds; 2) valid US addresses and their nature, i.e. residential, commercial, or vacant; 3) valid address/name combinations; 4) high risk zip codes; 5) public information, such as bankruptcy filings, tax liens, and civil judgments; and 6) consumer and purchase data.

The proposed data element structure within the risk database preferably includes at least the following:
1. Names of fraudulent or potentially fraudulent ("high risk") primary, secondary, and additional cardholders in the form of first name, last name, and middle initial.
2. Fraudulent or potentially fraudulent ("high risk") home and business addresses, including P.O. Box, city, state, and zip code.
3. Fraudulent or potentially fraudulent ("high risk") home and business telephone numbers.
4. Fraudulent or potentially fraudulent ("high risk") social security numbers of primary, secondary, and additional cardholders.

The risk database would act as a central repository for fraud data to be queried against by lenders and adjacent market users. Potential primary users or clients include bank card issuers, non-bank card issuers, potential card issuers, oil card issuers, merchants, and retailers. Possible secondary users include phone companies, DDA Account banks, and utility companies, among others.

Figure 2:
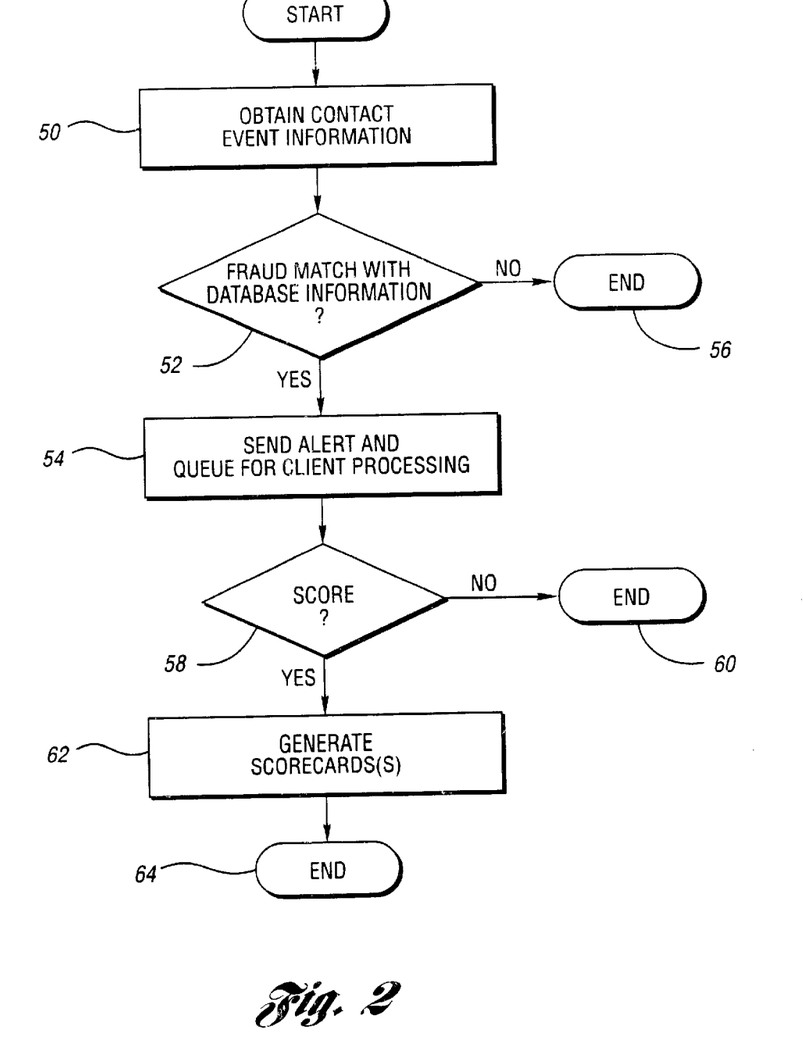
FIG. 2 is a flow diagram of a method for detecting purchasing card fraud which includes a scoring methodology developed in accordance with the present invention.

The method of detecting potential purchasing card fraud of the present invention is outlined in the flow diagram of FIG. 2. The method includes obtaining contact event information at the mainframe 16, as represented by block 50. Comparing the contact event 18 information to fraud information stored in the risk database 10, as represented by block 52. If a match is found between the contact event information and the fraud information, the method further includes issuing an on-line alert to the client and queuing the information for manual review by the particular client, as represented by block 54. If a match does not occur client 20 is notified as such and communication with risk database 10 is concluded, as represented by block 56. Optionally, a fraud match may be scored, as represented by block 58 and as will be explained below. If a client 20 does not wish to receive a score then communication with the database is concluded, as represented by block 60. However, if a client has elected to receive a match score, a scorecard is generated and sent to the client 20, as represented by block 62 and then communication with risk database is terminated at block 64.

Within the system of the present invention, contact event 18 transactions are preferably structured to create automatic queries which compare account record data elements against the fraud information stored in the risk database. If a match is found between the account data and the fraud data, then an alert message is generated by the system in real time, "near" real time, or via batch to the queue. In addition, the account record is sent to an on-line queue to be monitored and/or manually worked by the client. Upon entry to the queue, the contact event transaction is suspended or placed on hold until manual follow-up is completed. The contact event information may for example be purged from the database.

An additional feature of the present invention is to offer clients 20 the option of having matched fraud data records "scored" to assist in the decisioning/actioning processes when a record is queued. Preferably, a generic suite of scorecards is provided, while also allowing client-defined scorecards to be developed and implemented. In a preferred embodiment, a scorecard is provided which predicts the likelihood of a fraudulent takeover of an existing, active, or inactive cardholder account.

Figure 3:
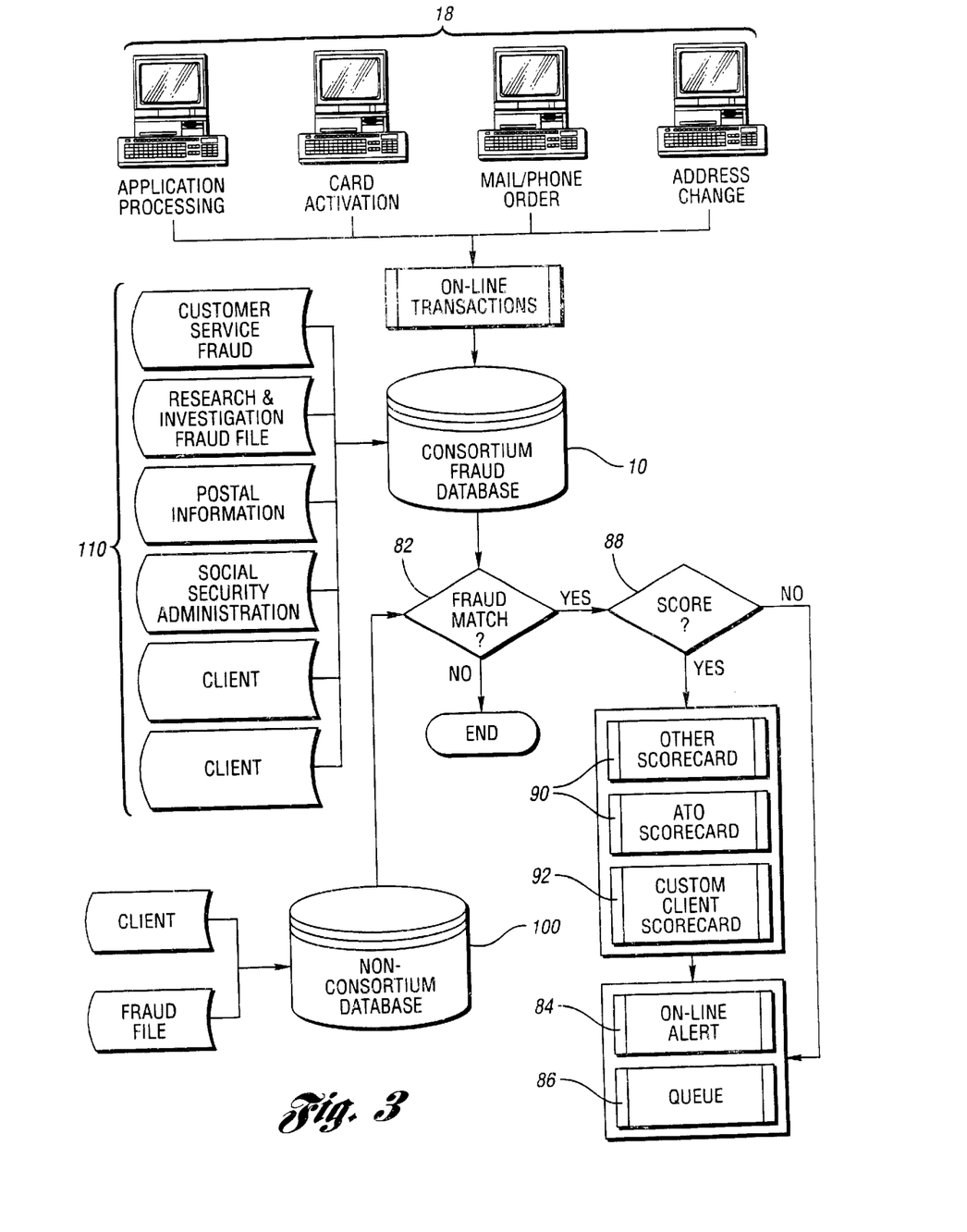
FIG. 3 is a flow diagram of a fraud matching process including scoring a fraud match in accordance with the present invention.

The following attributes of the invention are thus possibly provided to facilitate fraud detection at all stages of a purchasing card life cycle:
  Application Processing
  Card Activation
  Cardholder Usage/Maintenance
  Other Transaction or Contact Events: Priority Non-Mons: PIN changes, plastic requests, credit line increases and changes to the account record.
The components of the invention are:
  Consortium Data Warehouse
  Fraud Scoring
  Actioning (Alerts to On-Line Screens)
  Queuing for Manual Review
As shown in FIG. 3, selected non-monetary transactions may be structured to create queries which compare account record data elements against the Consortium Risk Database 10 of the invention. For example, during an account entry transaction 18 (application processing, card activation, mail/phone order, address change, and the like) key application data elements could automatically be compared against the Data Warehouse or Risk Database 10. If a match is found, as represented by block 82, between the account and the Data Warehouse, then an alert message 84 would be generated by the system real time, "near" real time, or via batch. In addition, the account record may be sent to an online queue 86 to be monitored and/or manually worked by the client. Upon entry to the queue the non-monetary transactions would be suspended or placed on hold until manual follow up is completed. In the case of new account entries and batch-entered new accounts, the accounts may be built on the system, however, plastic generation would be suspended.

Information residing within the queue 86 would include the account record information, the reason for the alert (i.e., potential fraudulent name, address, SSN, or phone number), and the contributing source of the matched data. This process will help to reduce responsibility/liability for data integrity.

In further keeping with the invention, clients will be provided the option of having matched fraud data records "scored" to assist in the decisioning/actioning processes when a record is queued, as represented by block 88. This should provide business opportunities to build the appropriate scorecard logic. Accordingly, a generic suite of scorecards 90 may be implemented as well as client-defined scorecards 92.

All consortium contributors will be allowed access to the entire data warehouse. Usage incentives may also be provided for "global" contributors. An example of a usage incentive may be reduced fees for accessing the fraud database. Other incentives may include partial to full access to information contained in the fraud database.

A non-contributor to the consortium may be offered access to information that the database manager may have purchased or provided in a non-consortium database 100. Otherwise non-contributors may be restricted from information provided by "global" contributors to the Risk Consortium Database.

Summary of Benefits and Critical Needs Met
 Provides a single source of uniform data from various contributor business sources;
 Increases the effectiveness of fraud detection efforts;
 Allows clients to reduce current manual processes for fraud identification and actioning;
 Pools data across the client base to improve identification of repeat offenders.
Consortium Risk Data Warehouse
 A consortium data warehouse contains data contributed from various business sources 110 including, but not limited to:
 Clients;
 Research and Investigation Fraud Files (Fraud App's and Account takeovers (type lost 3,5,8));
 Customer Service Fraud File Database;
 Card Activation ANI Risk Database;
 Postal NRI Database (high risk Zip Codes);
 Social Security Administration compromised SSN's;
 International Association of Financial Crimes Investigators;
 Cellular or Pay Phone Numbers/Numbers used fraudulently;
 Western Union Fraud Data;
 American Business List (prison addresses, hospitals, etc.);
 Account takeover modeling/scoring;
 Potential model for Skimmin;
 American Correctional Association;
 Lexis/Nexis.

Figure 4:
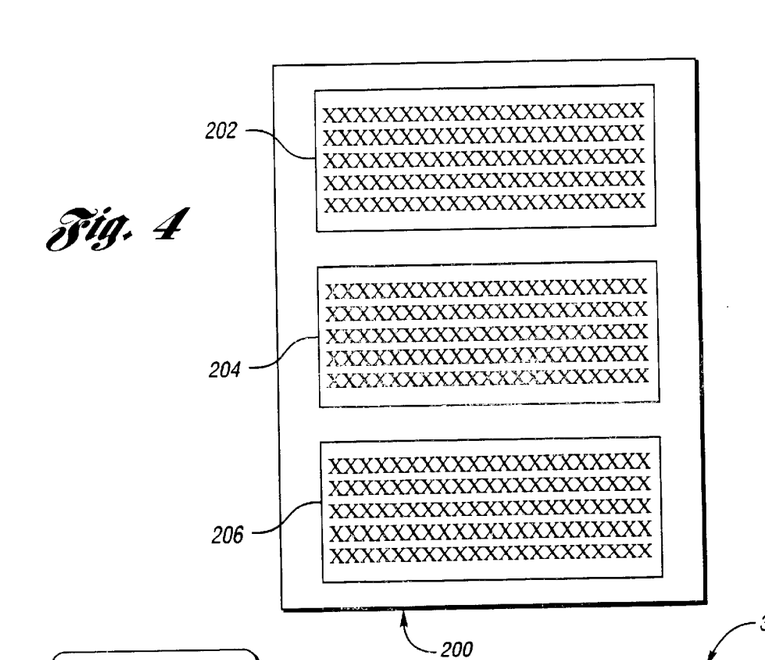
FIG. 4 is a diagrammatical representation of a merchant application summary document according to the present invention.

With reference to FIG. 4, a merchant application summary document (MASD) 200 is shown according to the present invention. The MASD is created by a merchant client and is sent to the Fraud Database to determine if a fraud match exists. The MASD is arranged to include generally three categories of information to assist in scoring a fraud match when a match occurs. The first category is unique identifiers 202. Unique identifiers 202 are generally information which when included in a merchant application can on their basis alone indicate a fraud match has occurred. For example, an identical match between unique identifier information on an MASD and fraud data in the fraud database would warrant the highest match score possible. A scoring of a match will be described in greater detail hereinafter.

The second category of information contained on the MASD 200 are the non-unique identifiers 204. Non-unique identifiers 204 consist of information which when taken alone are not sufficient to indicate with a high degree of certainty that a fraud match has occurred between the MASD as a whole and the information in the fraud database. For example, an MASD field containing an applicant's address may contain a first information portion which matches information in the fraud database and a second information portion which does not match information contained in the fraud database. A fraud match as such between only a portion of the non-unique identifiers and the fraud database would warrant a match score of only a fraction of what is required to indicate that the MASD information as a whole matches the information included in the fraud database.

The third category of information included in the MASD 200 is reference information 206. Reference information 206 are not part of the scoring process and therefore do not contribute to the match score. These fields include date of application, type of merchant, bank routing number, sales person, SIC code, and product type. These fields are included so that if necessary, investigative information may be drawn from them in order to determine fraudulent activity.

Figure 5A:
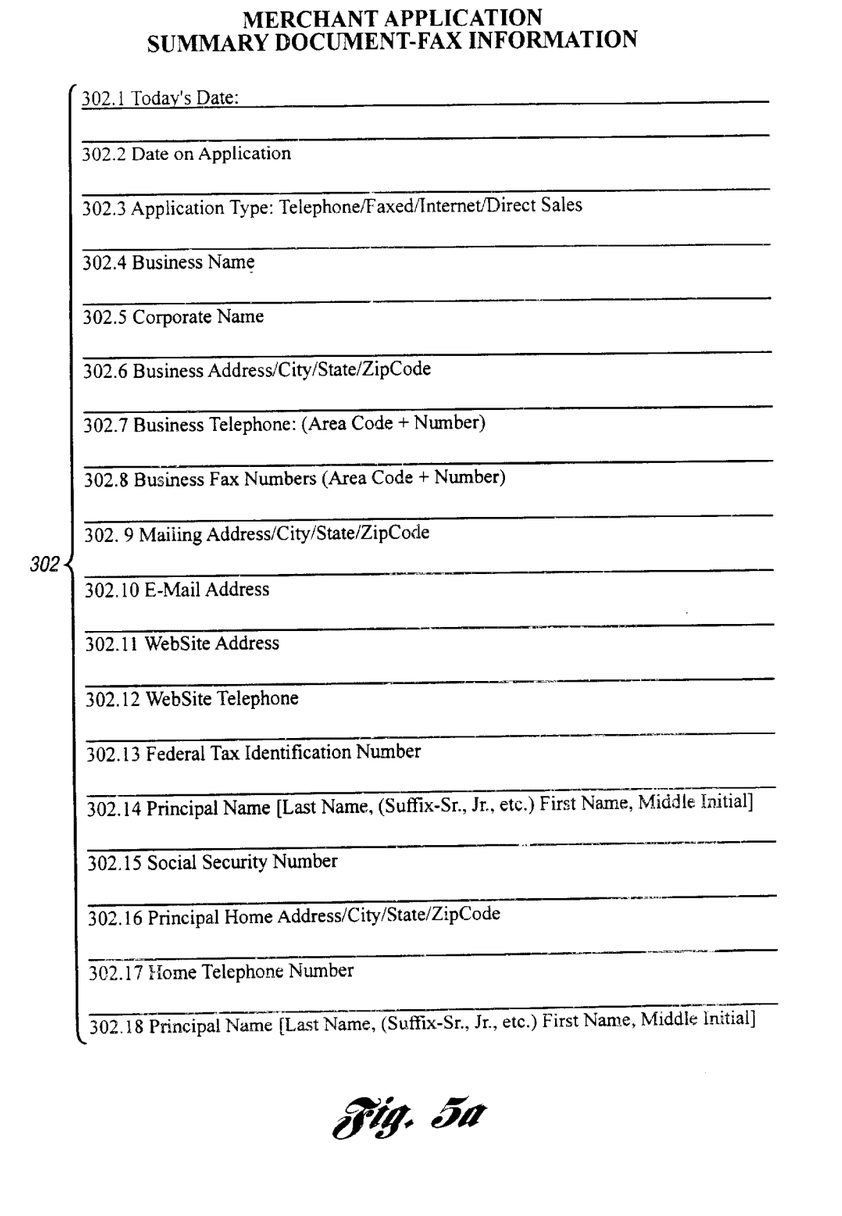
FIGS. 5a and 5b is a preferred embodiment of a merchant application summary document designed in accordance with the present invention.
Figure 5B:
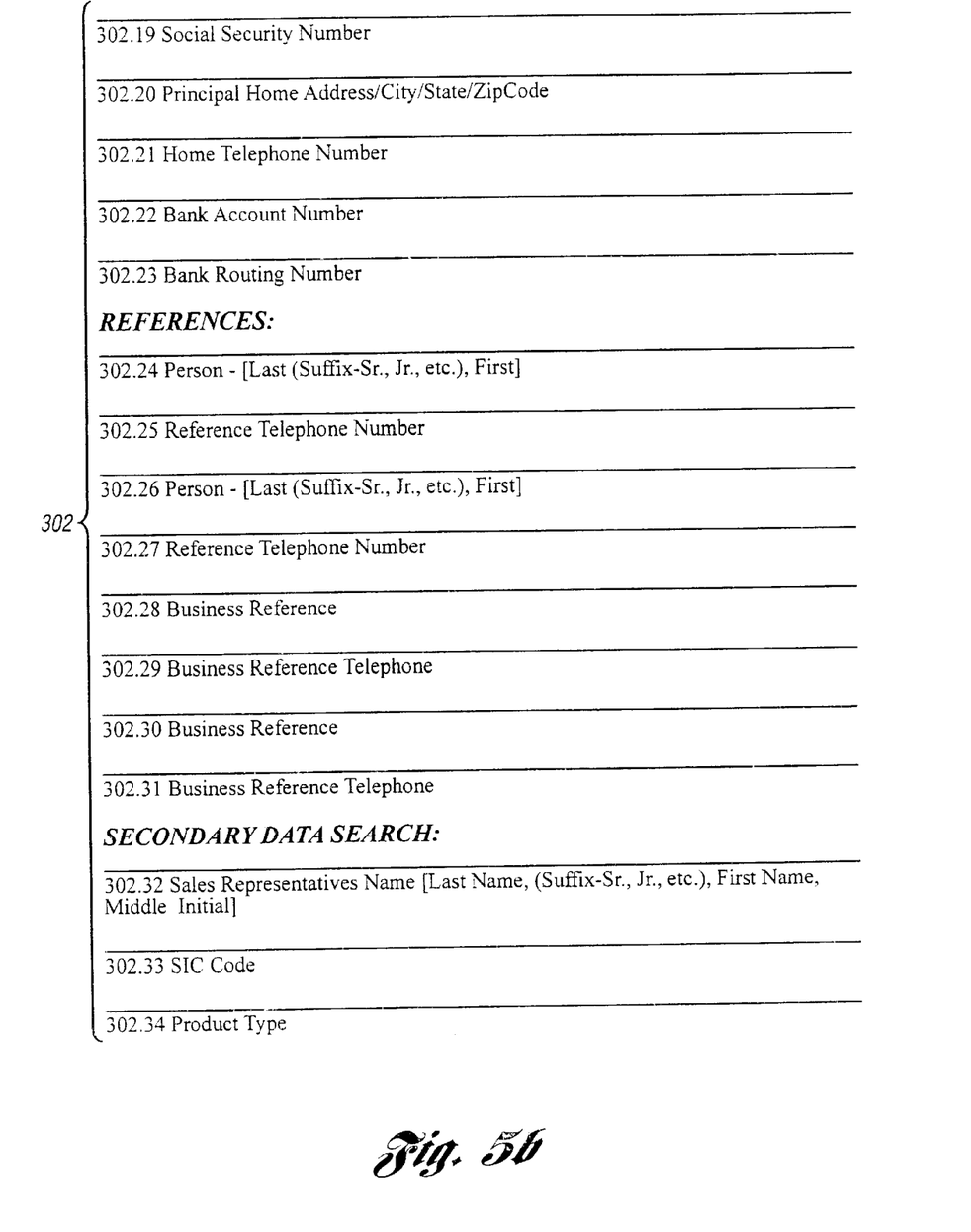

Reference is now made to FIGS. 5a and 5b, which illustrate a preferred MASD 300, according to the present invention. Preferred MASD includes a plurality of fields 302 numbered from 302.1 through 302.34. A field may contain numerical characters as well as alphabetical characters. Any particular field may contain a series of numbers, a single word or a series of words. The preferred MASD form conins several fields in which a match is determined only on the first fifteen characters contained in the field. Those fields, for example, are fields 302.4 which is the business name field, field 302.5 which is the corporate name field, field 302.28 which is the business reference field, and field 302.30 which is another business reference field. Other fields contain information which if match the fraud database contribute individually to the overall match score. For example, field 302.6, 302.9, 302.16 and 302.20 are weighted address fields where the "street name" contributes a match value of five points, the "city name" contributes a match value of 2.5 points, the "state name" contributes a match value of 2.5 points, and the "zip code" contributes a match value of 2.5 points. Fields 302.14 and 302.18 are weighted "name" fields which each have components which contribute different match score if a match occurs with the fraud database. For example, the last name contained in fields 302.14 and 302.18 has a match score worth 6 points, the first name has a match score of 1 point, the middle name has a match score of 3 points, and the suffix has a match score of 3 points if each of these components match the information stored in the fraud database. Fields 302.24 and 302.26 are weighed fields where the "last name" is worth 6 points and the first name is worth 4 points.

Figure 5C:
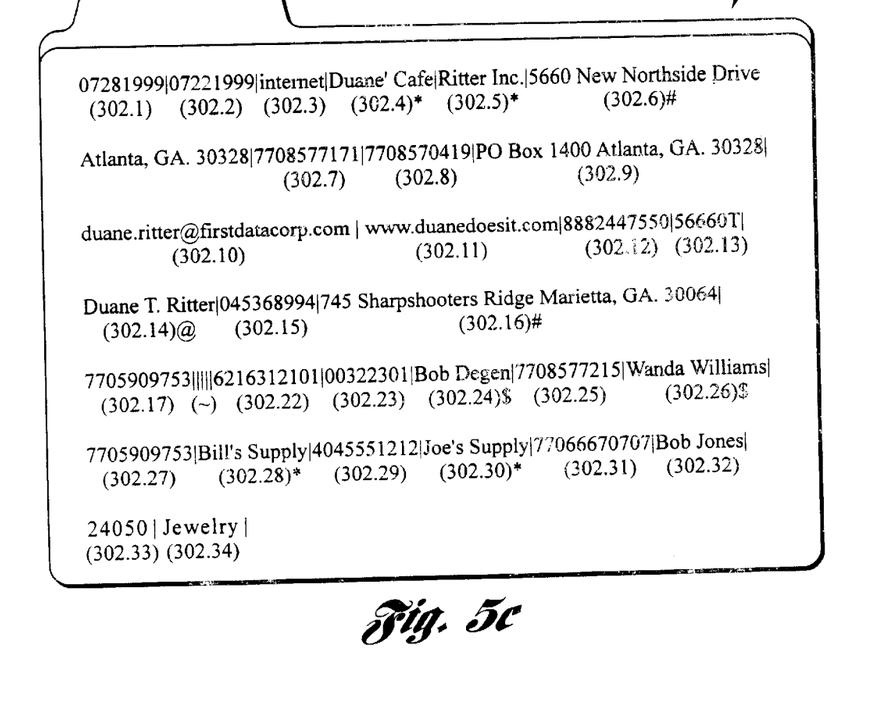
FIG. 5c is a data file including information from the merchant application summary document in a pipe delineated format.

FIG. 5c illustrates a data file 350 which may exist in electronic form within a computer storage media. Data file includes information from the MASD and is in pipe delineated format, as shown. Each data file portion 302.1 through 302.34 contained between the "pipes" corresponds with a field in the MASD. The fraud database uses data file 350 to conduct the fraud matching process. Each data file portion contributes a score value to a total match score. If the total match score exceeds a predefined value then a fraud match with a high degree of reliability is indicated.

A preferred set of rules for scoring a match between information in the data file portions 302.1 to 302.34 and information included within the fraud database is as follows:
Data file portions 302.4, 302.5, 302.28, and 302.30 are considered to match on the first fifteen characters;
Data file portions 302.6, 302.9, 302.16, 302.20 are weighted address fields each of which contain street, city, state, and zip code information, wherein if match the fraud database information contribute a match score of five for the street, two and a half for the city, two and a half for the state, and two and a half for the zip code;
Data file portions 302.14 and 302.18 are weighted name fields where the last name is worth six points, the first name is worth one point, and the middle name is worth three points and the suffix is worth three points;
Data file portions 302.24 and 302.26 are weighted fields where the last name is worth six points and the first name is worth four points;
All fields in the MASD must be entered into data file 350 in the same order as they appear on the MASD. If a field in the MASD contains no information or information which can not be entered into the data file, the data portion in the data file should be left blank and pipes should be added to denote the blank field;
If any single field or a combination of fields that produce a total match score of ten or more will be considered a match and be referred for further analysis;
An exact match in any of the following unique identifier fields is worth a match score of ten: 302.4, 302.5, 302.7, 302.8, 302.10 through 302.13, 302.15, 302.17, 302.19, 302.21, 302.22, 302.25, 302.27, 302.29, and 302.31;
A "sounds-like" match in any of the unique identifier fields is worth a match score of two and a half;
A weighted score of ten or more in the non-unique identifier fields: 302.6, 302.9, 302.14, 302.16, 302.18, 302.20, 302.24, 302.26, 302.28, and 302.30 is considered a match;
A "sounds-like" match in any of the non-unique identifier fields is given the same score as an actual match is given; and
Reference fields such as 302.1, 302.2, 302.3, 302.23, 302.32, 302.33, and 302.34 do not contribute to the total match score.

Figure 6:
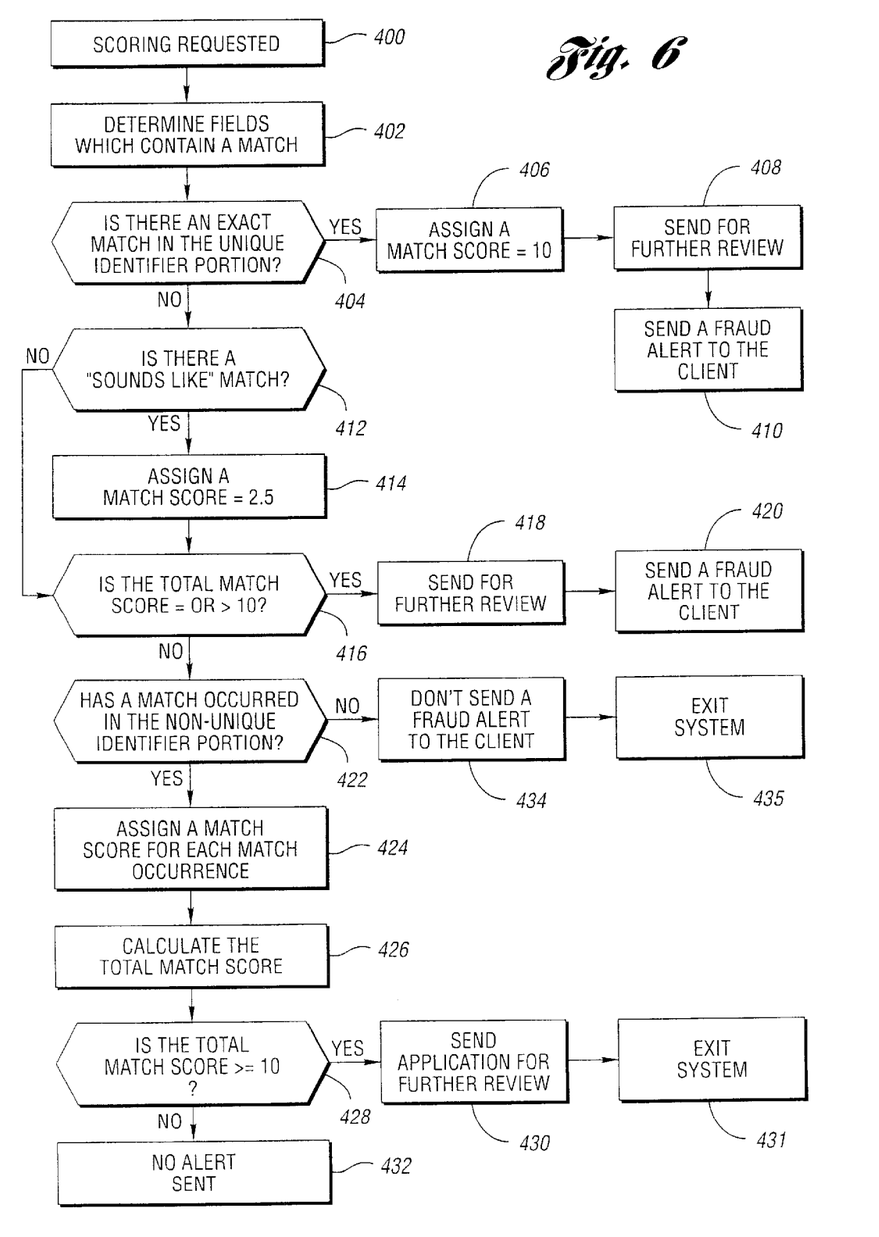
FIG. 6 is a flow diagram of a preferred fraud match scoring methodology according to the present invention.

Referring now to FIG. 6, a method for scoring a fraud match within a fraud detection system is illustrated, according to the present invention. If scoring is requested by a client a scoring process is initiated, as represented by block 400. At block 402 it is determined which fields in the MASD contain a match. If an exact match occurs in any of the unique identifier fields the highest match value is obtained (such as a match score of ten), and a fraud match alert will be sent to the client, as represented by blocks 404, 406, 408, and 410. However, if a "sounds-like" match occurs in any of the above fields a match value of less than the highest match value is obtained (such as a match score of two and a half). For example, in the "business address" field 302.6, if the address matches but the city, state and zip code does not a match value of 2.5 will be assigned, as represented by blocks 412 and 414. At block 416 a total match score is accumulated and if the total match score exceeds ten the system determines that a match has occurred, and sends the merchant application for further review, as represented by block 418. After further review, if a fraud. match is believed to have occurred an alert is sent to the client, as represented by block 420.

With continuing reference to FIG. 6, it is determined whether a fraud match has occurred in the non-unique identifier fields, as represented by block 422. A match value is accumulated based on an exact match or a sound like match in each of the non-unique fields and/or components of each of the fields, as represented by block 424. At block 426, the total match score is calculated. If the total match score exceeds ten the fraud match is sent for the review by fraud investigators, as represented by block 428 and 430. However, if the fraud match does not exceed ten the fraud match is not sent on to a criminal investigator and accordingly no alert is sent to the client, as represented by block 428 and 432. If no fraud matches exist between the non-unique fields and the fraud database the fraud matching process is complete and no fraud match is indicated therefore no alerts are generated and sent to the clients, as represented by block 434.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:
1. A method for determining likelihood of a fraudulent purchasing card traction using a fraud database having fraud data used in known frauds, the method comprising:
providing purchasing card applicant data for a purchasing card transaction, the purchasing card applicant data including a unique identifier portion having at least one unique identifier data element, a non unique identifier portion having at least one non-unique identifier data element, and a reference portion having at least one reference data element;
determining whether any of the purchasing card applicant data matches any of the fraud data used in known frauds of the fraud database;
determining which matched purchasing card applicant data occurs in the unique identifier portion, the non-unique identifier portion, and the reference portion;
determining which at least one unique identifier data element of the unique identifier portion matches any of the fraud data used in known frauds of the fraud database for each matched purchasing card applicant data occurring in the unique identifier portion;
determining which at least one non-unique identifier data element of the non-unique identifier portion matches any of the fraud data used in known frauds of the fraud database for each matched purchasing card applicant data occurring in the non-unique identifier portion;
determining which at least one reference data element of the reference portion matches any of the fraud data used in known frauds of the fraud database for each matched purchasing card applicant data occurring in the reference portion;
calculating a first match score based on each matched at least one unique identifier data element;
calculating a second match score based on each matched at least one non-unique identifier data element;
calculating a total match score by summing the first and second match scores; and
determining likelihood of the purchasing card transaction being fraudulent as a function of the total match score, wherein the purchasing card transaction is determined to be fraudulent when the total match score is greater than a predefined match score.

2. The method of claim 1 wherein the purchasing card applicant data includes personal information included on a merchant application.

3. The method of claim 2 wherein the personal information included on the merchant application is in a pipe delineated format.

4. The method of claim 1 wherein the unique identifier portion includes an applicant name field.

5. The method of claim 1 wherein the non-unique identifier portion includes an applicant address field.

6. The method of claim 1 further comprising assigning a first match score indicative of the purchasing card transaction being fraudulent when at least one of the at least one unique identifier data element of the unique identifier portion identically matches fraud data used in known frauds of the fraud database.

7. The method of claim 1 wherein calculating a fist match score based on each matched at least one unique identifier data element includes assigning a match score to each matched at least one unique identifier data element weighted as a function of the level of matching with fraud data used in known frauds of the fraud database.

8. The method of claim 1 wherein calculating a second match score based on each matched at least one non-unique identifier data element includes assigning a match score to each matched at least one unique identifier data element which is less than the predefined match score.

9. The method of claim 1 further comprising sending an alert to a merchant client involved in the purchasing card transaction when the total match score exceeds the predefined match score.

10. A system for determining likelihood of a fraudulent purchasing card transaction using a fraud database having fraud data used in known frauds, the system comprising:

purchasing card applicant data for a purchasing card transaction, the purchasing card applicant data including a unique identifier portion having at least one unique identifier data element, a non-unique identifier portion having at least one non-unique identifier data element, and a reference portion having at least one reference data element;

a processor operable for determining whether any of the purchasing card applicant data matches any of the fraud data used in known frauds of the fraud database and for determining which matched purchasing card applicant data occurs in the unique identifier portion, the nonunique identifier portion, and the reference portion;

wherein the processor is further operable for determining which at least one unique identifier data element of the unique identifier portion matches any of he fraud data used in known frauds of the fraud database for each matched purchasing card applicant data occurring in the unique identifier portion, determining which at least one non-unique identifier data element of the non-unique identifier portion matches any of the fraud data used in known frauds of the fraud database for each matched purchasing card applicant data occurring in the non-unique identifier portion, and determining which at least one reference data element of the reference portion matches any of the fraud data used in known frauds of the fraud database for each matched purchasing card applicant data occurring in the reference portion;

wherein the processor is further operable for calculating a first match score based on each matched at least one unique identifier data element, calculating a second match score based on each matched at least one non-unique identifier data element, and calculating a total match score by summing the first and second match scores;

wherein the processor is further operable for determining likelihood of the purchasing card transaction being fraudulent as a function of the total match score, wherein the purchasing card transaction is determined to be fraudulent when the total match score is greater than a predefined match score.

11. The system of claim 10 wherein the purchasing card applicant data includes personal information included on a merchant application.

12. The system of claim 11 wherein the personal information included on the merchant application is in a pipe delineated format.

13. The system of claim 10 wherein the unique identifier portion includes an applicant name field.

14. The system of claim 10 wherein the non-unique identifier portion includes an applicant address field.

15. The system of claim 10 wherein the processor assigns a first match score exceeding the predefined match score when the at least one of the at least one unique identifier data element of the unique identifier portion identically matches fraud data used in known frauds of the fraud database.

16. The system of claim 10 wherein the processor calculates a first match score based on each matched at least one unique identifier data element by assigning a match score to each matched at least one unique identifier data element weighted as a function of the level of matching with fraud data used in known frauds of the fraud database.

17. The system of claim 10 wherein the processor calculates a second match score based on each matched at least one non-unique identifier data element by assigning a match score to each matched at least one non-unique identifier data element weighted as a function of the level of matching with fraud data used in known frauds of the fraud database.

18. The system of claim 10 further comprising sending an alert to a merchant client involved in the purchasing card transaction when the total match score exceeds the predefined match score.

* * * * *